United States Patent
Romani

[11] Patent Number: 6,092,361
[45] Date of Patent: Jul. 25, 2000

[54] RECUPERATOR FOR GAS TURBINE ENGINE

[75] Inventor: Giuseppe Romani, Mississauga, Canada

[73] Assignee: Pratt & Whitney Canada Corp., Longueil, Canada

[21] Appl. No.: 09/086,982

[22] Filed: May 29, 1998

[51] Int. Cl.[7] ...................................................... F02C 7/10
[52] U.S. Cl. .................................. 60/39.161; 60/39.511
[58] Field of Search ........................... 60/39.161, 39.511, 60/266, 269; 415/206, 207

[56] References Cited

U.S. PATENT DOCUMENTS

| | | | |
|---|---|---|---|
| 2,548,978 | 4/1951 | Hawthorne | 60/266 |
| 2,631,429 | 3/1953 | Jacklin | 60/39.511 |
| 2,704,439 | 3/1955 | Cousins | 60/39.511 |
| 3,116,604 | 1/1964 | Holl . | |
| 4,081,957 | 4/1978 | Cox, Jr. . | |

FOREIGN PATENT DOCUMENTS

| | | | |
|---|---|---|---|
| 0 568 748 | 11/1993 | European Pat. Off. . | |
| 1003131 | 3/1952 | France . | |
| 2384951 | 10/1978 | France . | |
| 1011672 | 7/1957 | Germany | 60/39.511 |
| 615680 | 11/1949 | United Kingdom . | |
| 720436 | 12/1954 | United Kingdom . | |

*Primary Examiner*—Louis J. Casaregola
*Attorney, Agent, or Firm*—Jeffrey W. Astle

[57] ABSTRACT

The fuel efficiency of a gas turbine engine is enhanced by preheating compressed air before combustion by passing the compressed air through a heat exchange recuperator in thermal contact with hot exhaust gases. An integral recuperator/heat exchanger is defined by multiple diffuser pipes routed from a centrifugal compressor to extend radially across the hot gas duct through the inner and outer duct walls. As a result, a recuperative heat exchange air passage is defined by the compressor, diffusers, combustion chamber and hot gas duct, where the recuperative heat exchange air flow passage consists of a minimal simple single loop. Since many engines currently use a pipe diffuser, there is very little increase in air flow resistance by merely re-routing the pipe diffuser to cross the exhaust duct. In contrast, conventional heat exchange recuperators include structures which dramatically increase internal air flow resistance, engine weight and frontal area due to the relatively bulky and numerous convoluting ducts usually included.

5 Claims, 2 Drawing Sheets

RECUPERATOR FOR GAS TURBINE ENGINE

TECHNICAL FIELD

The invention is directed to improving fuel efficiency of a gas turbine engine through preheating compressed air before combustion by passing the compressed air through an integral heat exchange recuperator in thermal contact with hot exhaust gases, the recuperator representing a simple rerouting of pipe diffusers through the hot exhaust duct to form a single loop air flow passage in conjunction with a reverse flow combustion chamber.

BACKGROUND OF THE ART

Gas turbine engines with heat exchange recuperators are well known in the prior art. A recuperator is a heat exchanger which utilizes hot exhaust gases from the engine to heat the compressed air input from a compressor prior to insertion of the compressed air to the combustion chamber. Preheating the compressed air improves fuel efficiency of the engine in a number of ways.

The amount of heat which must be provided by the burners is reduced and therefore, the size of burner and fuel consumption is accordingly reduced. In addition, the pressure output from the compressor can be reduced since the addition of heat to the cold compressed air, increases the potential energy of the compressed air which is proportional to the product of pressure and temperature. Therefore, increasing pressure or increasing temperature have similar effect on the end result.

In general, the heat from exhaust gases is considered as a waste, however, in the case of military aircraft, the production of heat is a prime concern since the exhaust gas heat aids in identification and targeting of military aircraft using infrared tracking technology. Therefore, by reducing the heat of exhaust gases, the infrared signature of the aircraft can be reduced.

Prior art recuperators, however, suffer from significant advantages. In general, the prior art devices are large and heavy structures which render them completely unsuitable for aircraft use. Aircraft engines must maintain a minimal frontal area to minimize drag. The inclusion of large heat exchange ducts and recuperators increase the frontal area of aircraft engines to the extent that the gains acquired from use of a recuperator are lost in drag caused by the size of the engine.

As well, prior art recuperators include complex convoluted heat exchange ducting which increases internal resistance to air flow and adds operational load on the compressor. For example, including several heat exchange cross-flow pipes in an exhaust manifold will increase air flow resistance of the exhaust and air flow resistance into the combustion chamber simultaneously. The cumulative effect of a complex heat exchange recuperator will be to increase the load on the compressor and reduce the engine output thrust. As a result therefore, on balance the gains made through use of a conventional heat exchange recuperator are not significantly in excess of the losses in engine efficiency when all disadvantageous factors are included.

For example, U.S. Pat. No. 4,506,502 to Shapiro includes a large drum honeycomb heat exchanger which is heavy and expensive to manufacture, in addition to increasing air flow resistance within the engine. The combination of these factors renders it completely unsuitable for aircraft use.

In a like manner, U.S. Pat. No. 5,119,624 to McKenna includes large heat exchangers inserted in exhaust ports of an engine to preheat the compressed air. Such ducts increase the size and weight of the engine rendering it unsuitable for aircraft use. However, where gas turbine engines are used as auxiliary power units for ground level electrical generation for example, such arrangements may be useful. A further example of large size heat exchangers on gas turbine engines are shown in U.S. Pat. No. 4,141,212 to Koschier and U.S. Pat. No. 4,974,413 to Szego.

An improvement over such large size ducting is shown in U.S. Pat. No. 5,253,472 to Dev wherein the heat exchange recuperator is provided generally within the conventional outward dimensions of a gas turbine engine. A significant disadvantage of the Dev system is the large number of small heat transfer tubes through which the compressed air must be conducted and the number of turns that the compressed air is forced to go through before entering the combustion chamber. The large number of small heat transferred tubes significantly increases air flow resistance. The complicated convoluted path followed by the compressed air through multiple bends while beneficially increasing heat transfer, also significantly increases internal air flow resistance. Both of these factors significantly increase the air flow resistance and operational load on the compressor and engine as a whole increasing fuel consumption. It is expected that the increase in fuel consumption due to internal air flow resistance practically overrides any decrease in fuel consumption gained from preheating the compressed air.

It is an object of the invention therefore, to obtain the fuel consumption reductions available through use of a heat exchange recuperator while impeding air flow resistance within the engine as little as possible.

It is a further object of the invention to provide a heat exchange recuperator which does not increase the outward size and dimension of the gas turbine engineer.

It is a further object of the invention to provide a heat exchange recuperator which adds minimal weight increase and engine complexity to the gas turbine engine.

DISCLOSURE OF THE INVENTION

The invention improves fuel efficiency of a gas turbine engine through preheating compressed air before combustion by passing the compressed air through a heat exchange recuperator in thermal contact with hot exhaust gases.

Generally gas turbine engines have a longitudinal rotary axis, a compressor, combustion chamber, an array of diffuser pipes for conducting compressed air from the compressor to the combustion chamber, and a compressor turbine and power output turbine with vanes in an annular hot gas duct defined between the combustion chamber and an exhaust port.

The improvement provided by the invention relates to the inclusion of an integral recuperator defined when each of the diffuser pipes is routed to extend radially across the hot gas duct through the inner and outer hot gas duct walls. As a result, a recuperative heat exchange air passage is defined by the compressor, diffusers, combustion chamber and hot gas duct, where the recuperative heat exchange air flow passage consists of a minimal simple single loop.

Since many engines currently use a pipe diffuser, there is very little increase in air flow resistance by merely rerouting the pipe diffuser to cross the exhaust duct. In contrast, conventional heat exchange recuperators include structures which dramatically increase internal air flow resistance, engine weight and frontal area due to the relatively large convoluting ducts included. Use of heat exchange fins can increase heat exchange efficiency without drastically increasing internal air flow resistance.

With a single loop recuperator design, the power output turbine may be disposed in the hot gas exhaust duct upstream of the compressor turbine (opposite to the conventional disposition) thereby eliminating the need for nested coaxial shafts in some cases.

Where an impeller-type compressor is used, the diffuser pipes are generally arcuate in order to redirect air flow from the radial to the axial direction. Using an arcuate diffuser pipe as part of a recuperator effectively increases the length of the pipe diffuser, increases the compressed air dwell time in thermal contact with the hot exhaust duct gases and therefore aids the heat exchange process. To further increase heat exchange efficiency the diffuser pipes may include external heat exchange fins, and may adopt an aerodynamically efficient airfoil profile.

In commercial production, the recuperator with integral pipe diffusers and exhaust duct can be simply manufactured as a metal casting. A single cast recuperator can replace several conventional components (ie: multiple diffuser pipes of complex geometry and exhaust duct) thereby simplifying assembly and maintenance.

Further details of the invention and its advantages will be apparent from the detailed description and drawings included below.

BRIEF DESCRIPTION OF THE DRAWINGS

In order that the invention may be readily understood, one preferred embodiment of the invention will be described by way of example, with reference to the accompanying drawings wherein.

DETAILED DESCRIPTION OF PREFERRED EMBODIMENTS

Figure 1:
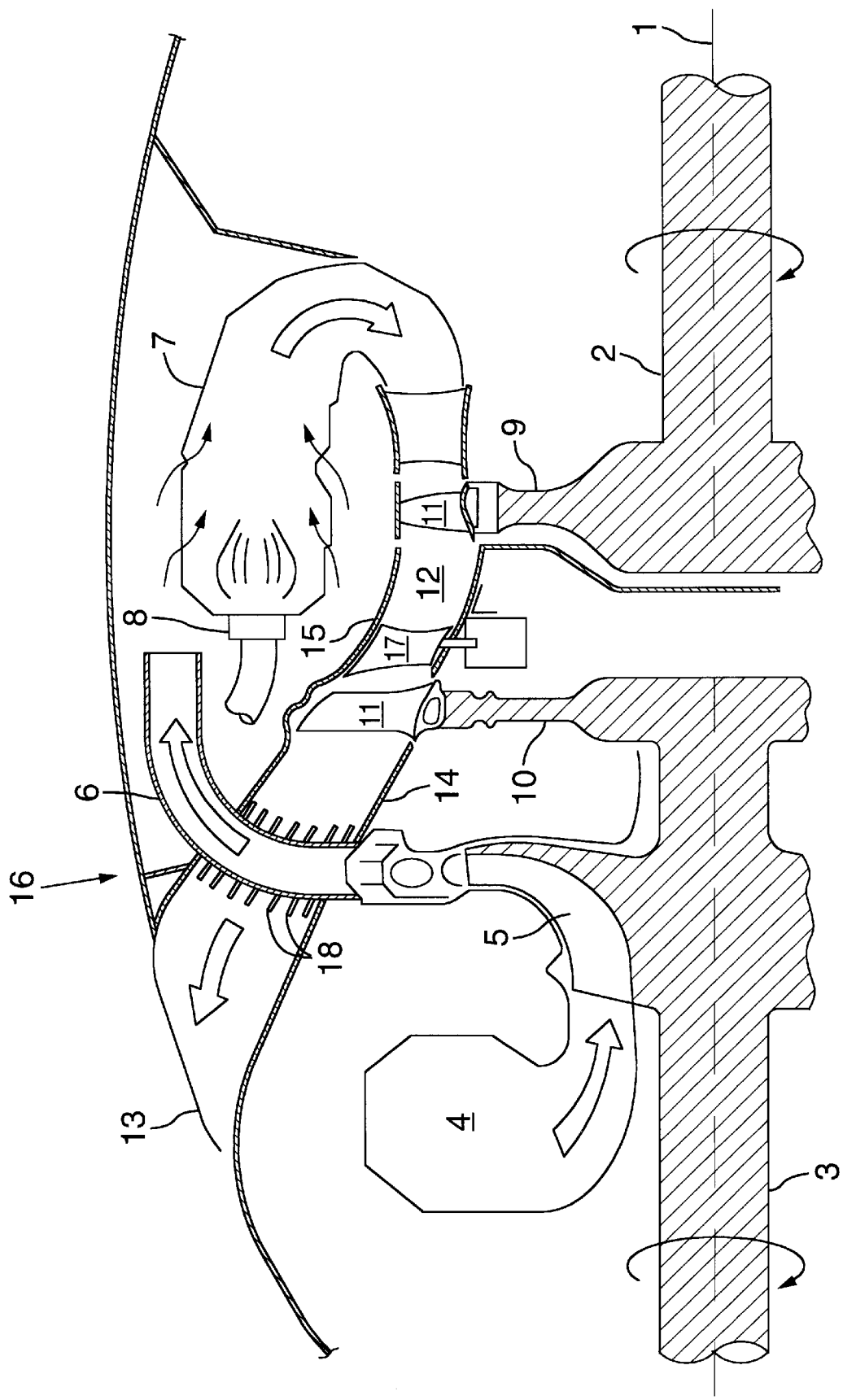
FIG. 1 is a partial axial cross-sectional view through a gas turbine engine according to the invention wherein airflow passes through an impeller type compressor through an arcuate finned diffuser pipe extending through the exhaust duct, thereafter into the combustion chamber and hot gas pathway driving a power output turbine and compressor turbine before exiting through an exhaust port.

Referring to FIG. 1, the relevant axial section of a gas turbine engine in accordance with the invention is illustrated. It is considered that the operation of a gas turbine engine is well known to those skilled in the art and therefore, the general operation and design concerns are not included as part of this description.

Briefly stated, a gas turbine engine includes a longitudinal axis 1 about which one or more shafts rotate. In the embodiment illustrated in FIG. 1, the gas turbine engine includes a power output shaft 2 and a compressor shaft 3. The compressor shaft 3 may also be used to power auxiliary units as is conventional.

Ambient air is brought into the engine through an intake (not shown) into an intake plenum 4 of a toroidial shape. Rotation of the compressor shaft 3 rotates the compressor impeller 5 which drives the compressed air radially outwardly through a plurality of diffuser pipes 6. Fuel is ignited in a combustion chamber 7 dispersed by a fuel nozzle 8 in the presence of the compressed air exiting from the diffuser pipes 6.

In the embodiment shown, the combustion chamber 7 is a reverse flow type which conducts the hot combustion gases past a power output turbine 9 and a compressor turbine 10. The power output turbine 9 and compressor turbine 10 each have vanes 11 within an annular hot gas duct 12 between the combustion chamber 7 and exhaust port 13. The annular hot gas duct 12 as shown is defined between an inner duct wall 14 and an outer duct wall 15.

The invention provides an integral recuperator indicated generally with drawing reference numeral 16. The recuperator 16 comprises an annular array of several diffuser pipes 6 each of which extends radially across the hot gas duct 12 through the inner duct wall 14 and outer duct wall 15. By passing the diffuser pipes 6 through the exhaust portion of the hot gas duct 12, a recuperative heat exchange air passage is defined. The arrows shown in FIG. 1 generally outline the direction of recuperative heat exchange air passage flow. The passage begins at the compressor 5, passes through the diffuser 6 and into the combustion chamber 7. Thereafter the passage follows the hot gas duct 12 out through the exhaust port 13. As apparent from the embodiment shown in FIG. 1, the recuperative heat exchange air flow passage consists of a minimal single loop.

In contrast, conventional heat exchange recuperators utilize several undulating loops or complicated multiple tubes to accomplish the same preheating purpose. The invention provides a recuperator which does not significantly increase the internal airflow resistance of the engine since many conventional engines already include diffuser pipes of the type illustrated. Of course the inclusion of the diffuser type 6 into the hot gas duct 12 increases flow resistance to exhaust gases, however, in comparison to the convoluted multiple ducts shown in the prior art, this slight increase in flow resistance is considered minimal.

An advantage in certain circumstances of the arrangement shown in FIG. 1, is that the power output turbine 9 is disposed in the hot gas duct 12 upstream of the compressor turbine 10. This is an arrangement which is generally opposite to conventional engines wherein the first turbine which hot gases impinge upon is the compressor turbine 10. By including a looping airpassage thus reversing the order of turbines, the invention enables designers to eliminate costly coaxial nested dual shafts in certain circumstances.

A rotatable variable geometry vane 17 is disposed in the hot gas duct 12 between the power output turbine 9 and compressor turbine 10 to ensure that hot gas flow does not result in a stall condition when passing over vanes 11 of the compressor turbine 10. This rotatable variable geometry vane 17 is not considered essential in all circumstances.

Figure 2:
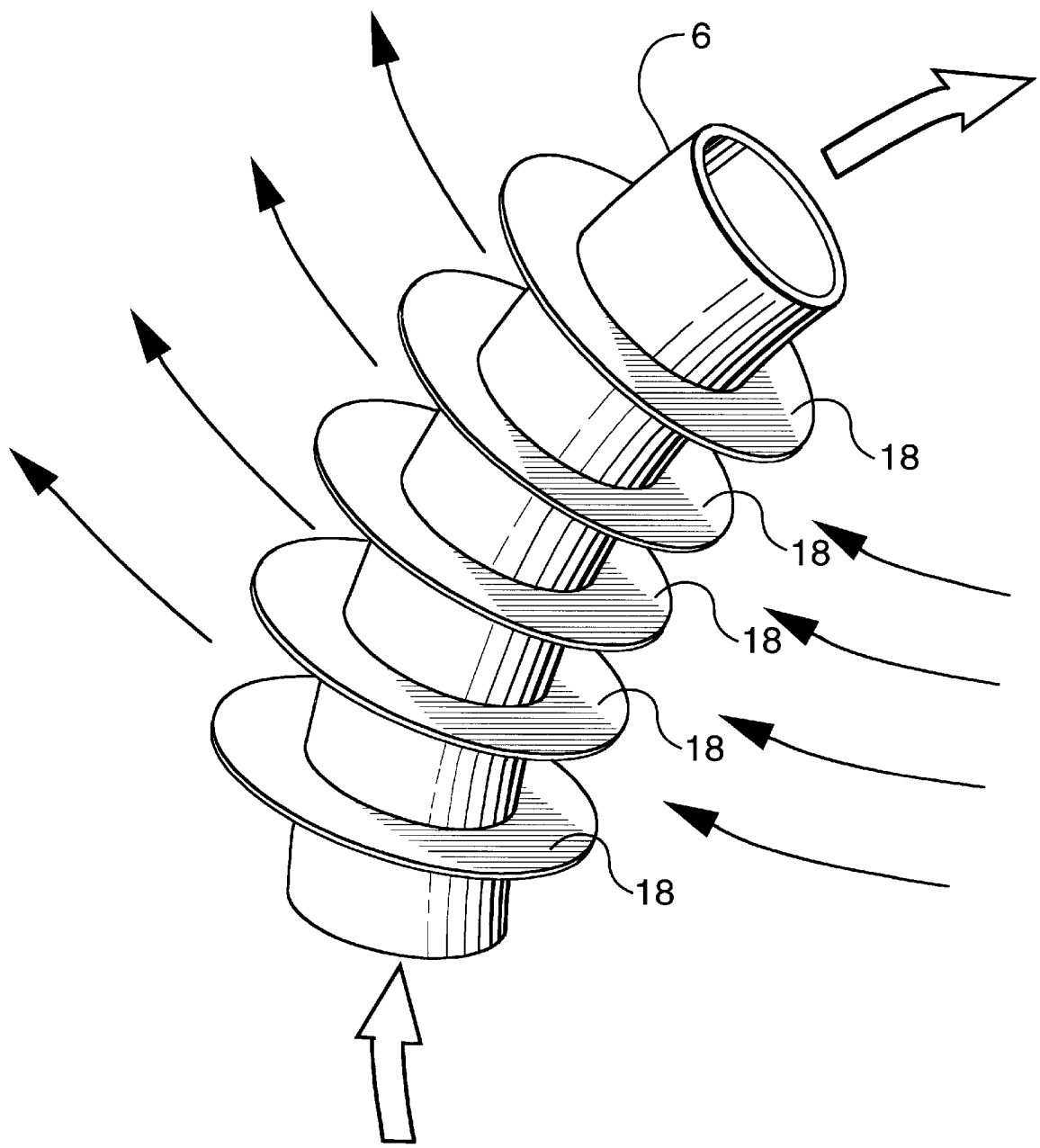
FIG. 2 is a detail perspective view of a single diffuser pipe including heat exchange fins and showing the direction of cross-flow between cold compressed air inside the diffuser pipe and hot exhaust gases passing over the exterior of the diffuser pipe and fins.

As shown in FIGS. 1 and 2, the preferred diffuser pipe 6 is arcuate where an impeller 5 is used as the compressor. Generally an impeller compressor is more economical than an axial compressor and utilizes less space, however, an impeller compressor requires that the radial output flow of compressed air be redirected to an axial direction prior to presentation to the combustion chamber 7. However, this arcuate shape of diffuser pipes 6 can be turned to significant advantage where diffuser pipes 6 are utilized in a heat exchanged recuperator 16. The arcuate shape of the diffuser pipe 6 in effect lengthens the diffuser pipe 6 thereby increasing thermal contact with the hot exhaust gases. It will be understood that diffuser pipes 6 will be utilized in conjunction with an axial flow compressor as well. In such a case, for example, an axial flow compressor (not shown) will result in an axial flow of air which can be collected in a manifold which feeds an array of diffuser pipes 6 passing through the exhaust portion of the hot gas path 12. However, it is unlikely that significant curvature will be imparted to the diffuser pipes 6.

Therefore, use of an impeller type compressor has double advantage namely, in an economical use of a impeller compressor 5 and the increased heat exchange of arcuate diffuser pipes 6. In both cases as illustrated in FIGS. 1 and 2, the diffuser pipes 6 may optionally includes external heat exchange fins 16. Since the diffuser pipes 6 are imposed in the exhaust flow, it will of course, be advantageous to manufacture the diffuser pipes 6 with an aerodynamically efficient airfoil profile. For example, in the embodiment shown in FIG. 2, the profile is a egg shaped cross-section, however, the designer may provide diffuser pipes 6 with a complex airfoil shape if desired. For example, it is conventional to provide cooling air passage through turbine vanes 11. Therefore, the diffuser pipes 6 may be designed and manufactured utilizing a similar technology and adopt a vane like cross-section. Redirection of exhaust gas flow may therefore be provided in appropriate circumstances.

Although the above description and accompanying drawings relate to a specific preferred embodiment as presently contemplated by the inventor, it will be understood that the invention in its broad aspect includes mechanical and functional equivalents of the elements described and illustrated.

What is claimed is:

1. A gas turbine engine having a longitudinal axis, a centrifugal compressor, combustion chamber, plurality of radially extending diffuser pipes for conducting compressed air expelled radially from the centrifugal compressor to an axially rearward direction to the combustion chamber, and a compressor turbine and power output turbine with vanes in an annular hot gas duct including inner and outer hot gas duct walls defined between the combustion chamber and an exhaust port, the turbine engine further comprising:

an integral recuperator comprising a plurality of said diffuser pipes each extending radially across the hot gas duct through the inner and outer duct walls, whereby a recuperative heat exchange air passage is defined by the centrifugal compressor, diffuser pipes, combustion chamber and hot gas duct.

2. A gas turbine engine according to claim 1 wherein the power output turbine is disposed in the hot gas duct upstream of the compressor turbine.

3. A gas turbine engine according to claim 2 including a rotatable variable geometry vane disposed in the hot gas duct between the power output turbine and the compressor turbine.

4. A gas turbine engine according to claim 1 wherein the diffuser pipes are arcuate.

5. A gas turbine engine according to claim 1 wherein the diffuser pipes include external heat exchange fins.

* * * * *